Figure 1:
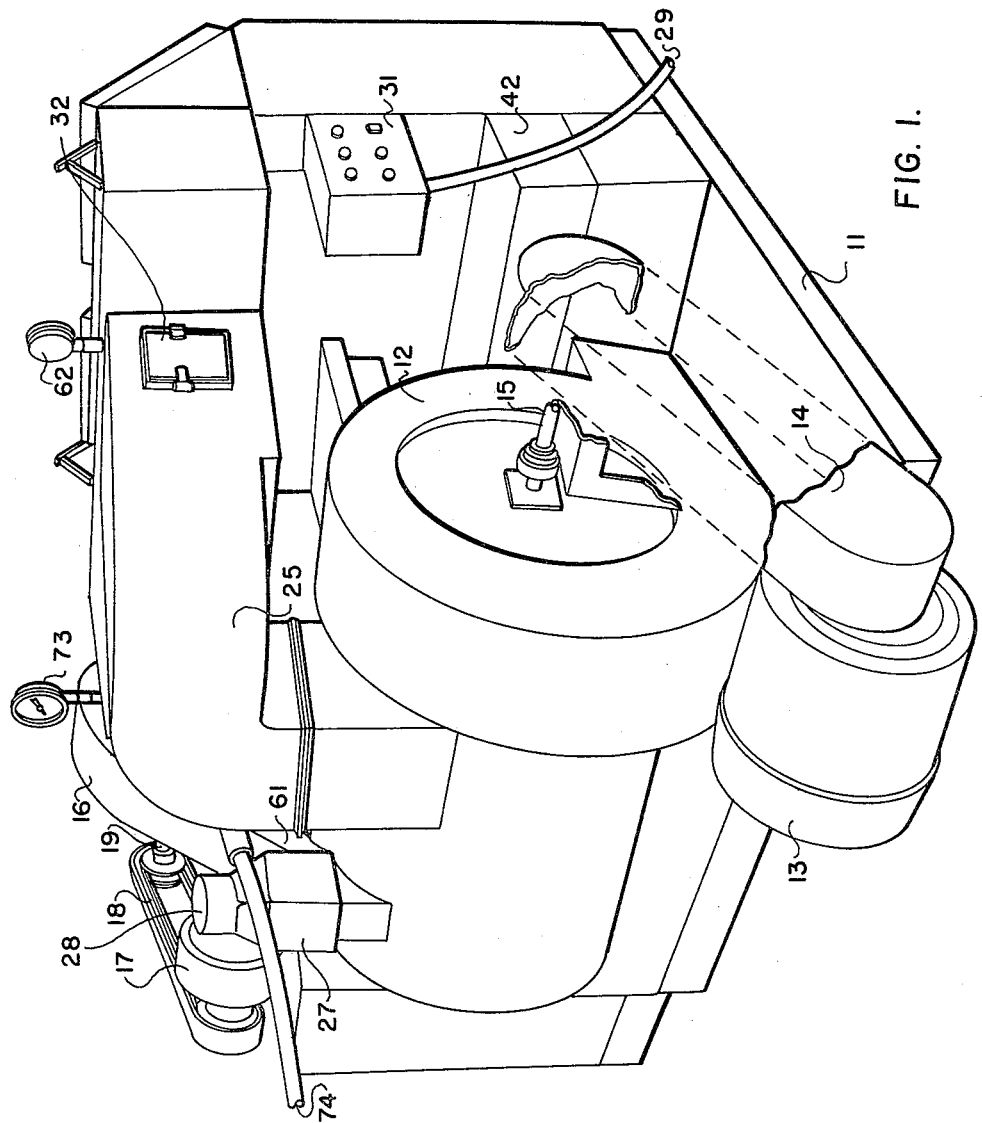

Sept. 18, 1962   C. W. HOYT ET AL   3,054,607
APPARATUS FOR DRYING CHARGED STORAGE BATTERY CELL ELEMENTS
Filed Sept. 30, 1959   5 Sheets-Sheet 1

FIG. I.

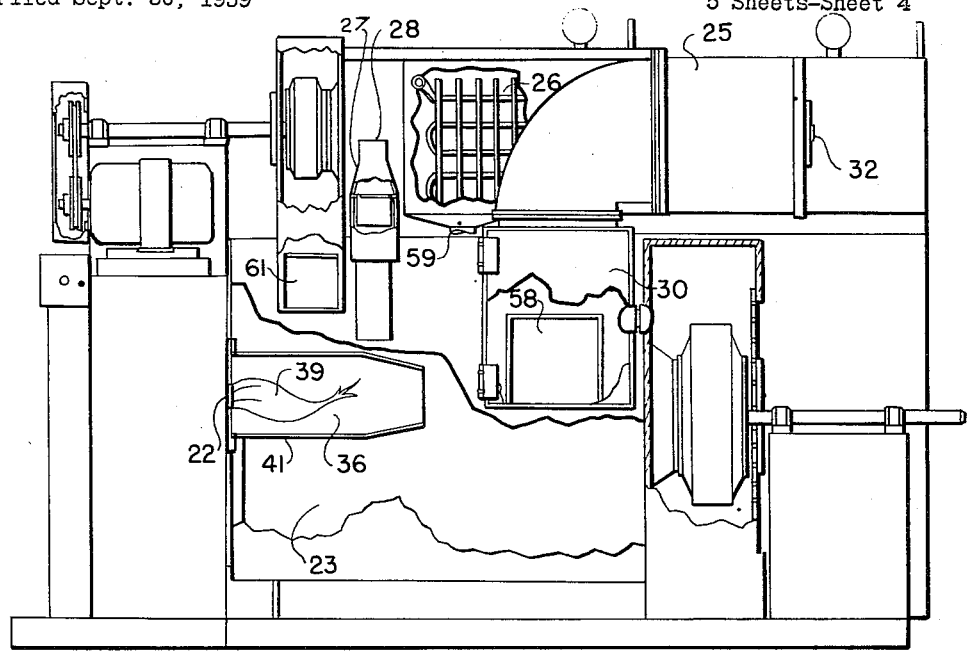
FIG. 5.
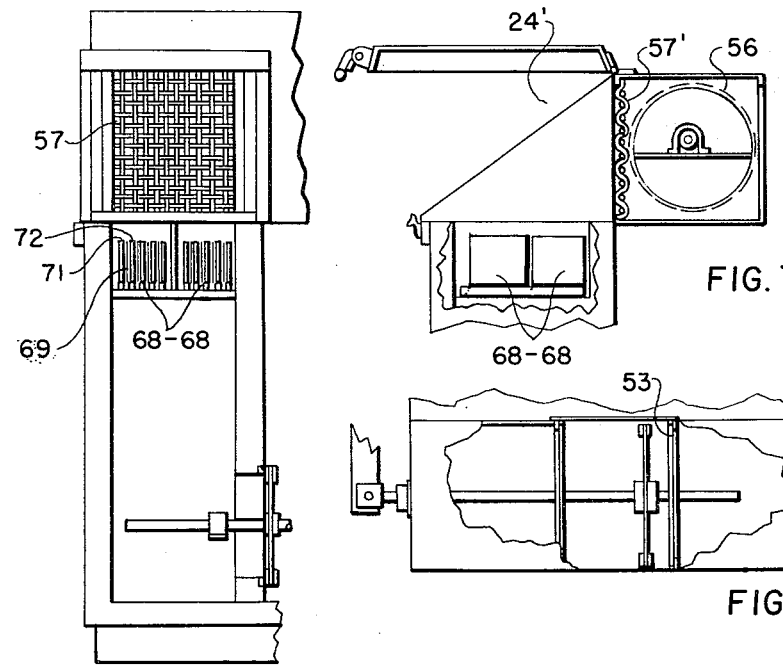
FIG. 7.
FIG. 6.
FIG. 8.

United States Patent Office 3,054,607
Patented Sept. 18, 1962

1

3,054,607
APPARATUS FOR DRYING CHARGED STORAGE
BATTERY CELL ELEMENTS
Charles W. Hoyt, West Newton, and James F. Murphy, Jr., Framingham, Mass., assignors to W. R. Grace & Co., Cambridge, Mass., a corporation of Connecticut
Filed Sept. 30, 1959, Ser. No. 843,557
5 Claims. (Cl. 263—36)

This invention relates to an improved apparatus for drying charged storage battery cell elements, i.e. units composed of positive and negative battery plates with interposed battery separators, which are to be used in the manufacture of dry charged batteries.

The major difficulty in the production of dry charged batteries is the tendency for the charged negative plates to oxidize during the drying operation. With the increasing demand for dry charged batteries, it has become more and more important to develop methods and machines for overcoming this difficulty and for carrying out the drying operation in a simple, efficacious manner.

Various methods for drying charged negative plates without excessive oxidation have been developed in the past. Drying has been carried out in an atmosphere of steam, or in a heated inert gas such as nitrogen or carbon dioxide. While high quality plates with a very low degree of oxidation have been produced by these processes, the apparatus needed for them is rather costly and so large that a very substantial amount of factory space is required. For this reason, their use has been to a large extent limited to the large producer, while the smaller independent manufacturer has not had either the capital or the working space required for such equipment. There is a certain amount of resistance, furthermore, especially among the smaller producers, to the use of either the compressed gases or the relatively high pressures within the drying equipment required by many of the prior art processes. Even more important is the length of the drying cycle in the above-described processes. For the most part, an hour or even longer is required for the complete drying cycle.

A recent development in this field is a process in which the cell elements including charged battery plates are dried in air, under operating conditions which permit only a relatively small amount of oxidation of the negative plates to take place. This process, which is described in United States Patent No. 2,880,520 to Ellis et al., is carried out at atmospheric pressure and in relatively inexpensive, compact equipment. A still greater advantage of the Ellis process is the very short drying time, normally only four to six minutes. With such a short drying cycle, even the small, inexpensive apparatus used in the Ellis process is capable of turning out a very substantial number of dry charged batteries per day.

The Ellis process, as it has been stated above, permits a limited amount of oxidation of the negative plates to take place. This amount of oxidation has been found to be permissible for most purposes, and batteries made from such plates have been found to meet the usual specifications of operating performance. There is an increasing demand, however, for batteries having superior characteristics and even higher standards of performance. For this reason, it has become important to reduce or if possible entirely eliminate the oxidation of the negative plates during the drying operation.

It is an object of our invention to develop a method and a machine for drying charged battery cell elements which will substantially eliminate oxidation of the negative plates during drying. Our invention has for its objective, furthermore, the production of drying apparatus which will be inexpensive, easy to operate, compact, and which will not require the use of pressures substantially in excess of atmospheric pressure. A still further object is to provide apparatus for drying charged battery plates or charged battery cell elements which will be suitable for use in relatively small manufacturing operations. Another and very important object of our invention is the development of an apparatus which will accomplish the drying operation rapidly, preferably within about six minutes.

We have developed an apparatus which is capable of drying storage battery cell elements rapidly and efficiently and with substantially no oxidation of the negative plates. Our improved apparatus provides a drying atmosphere which consists of the gaseous products resulting from burning a combustible gas in the presence of only that amount of oxygen which is necessary to support combustion. One of the salient features of our new drier is the use of a particular type of burner which can be operated with a minimum amount of oxygen, and which substantially consumes this amount of oxygen during the course of combustion. Our apparatus also includes a recirculating system for the gases within the apparatus, a device for allowing the intake of approximately the exact amount of air necessary for combustion, and a vent which allows the escape of a sufficient amount of gases from within the apparatus so that the pressure within the system is maintained at a level only slightly in excess of normal atmospheric pressure.

Figure 2:
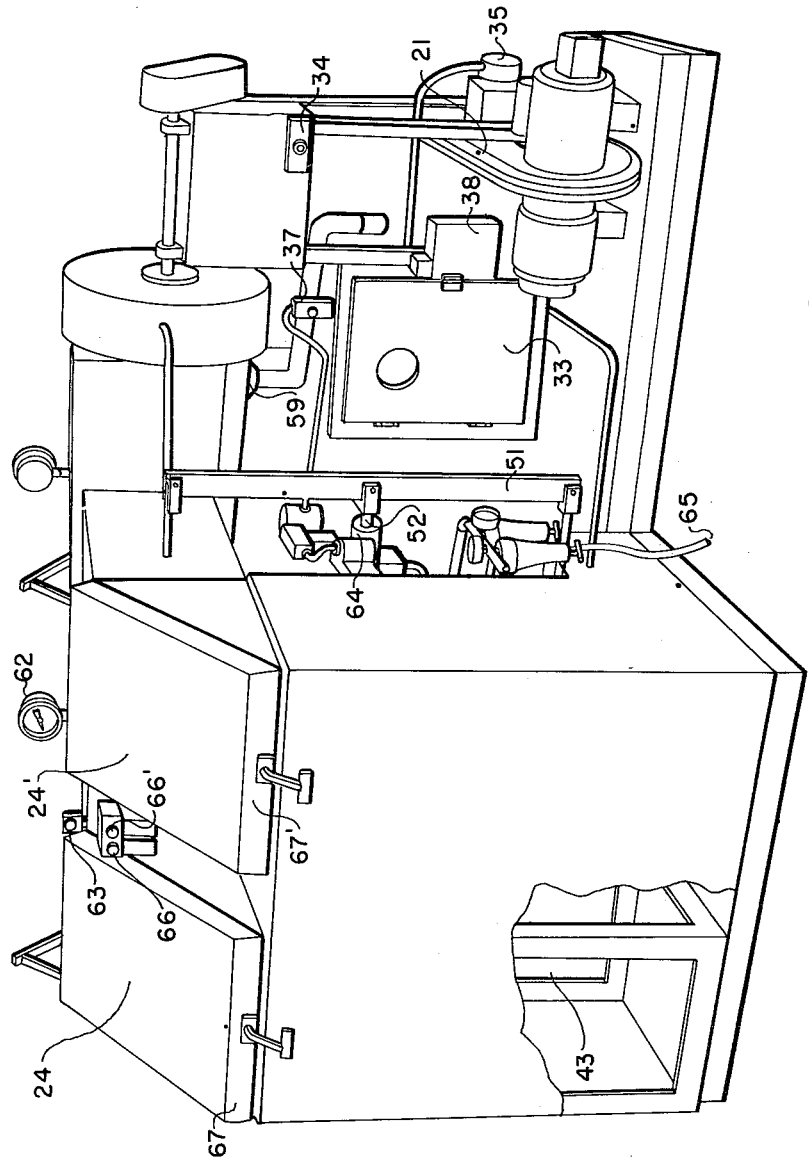
Figure 3:
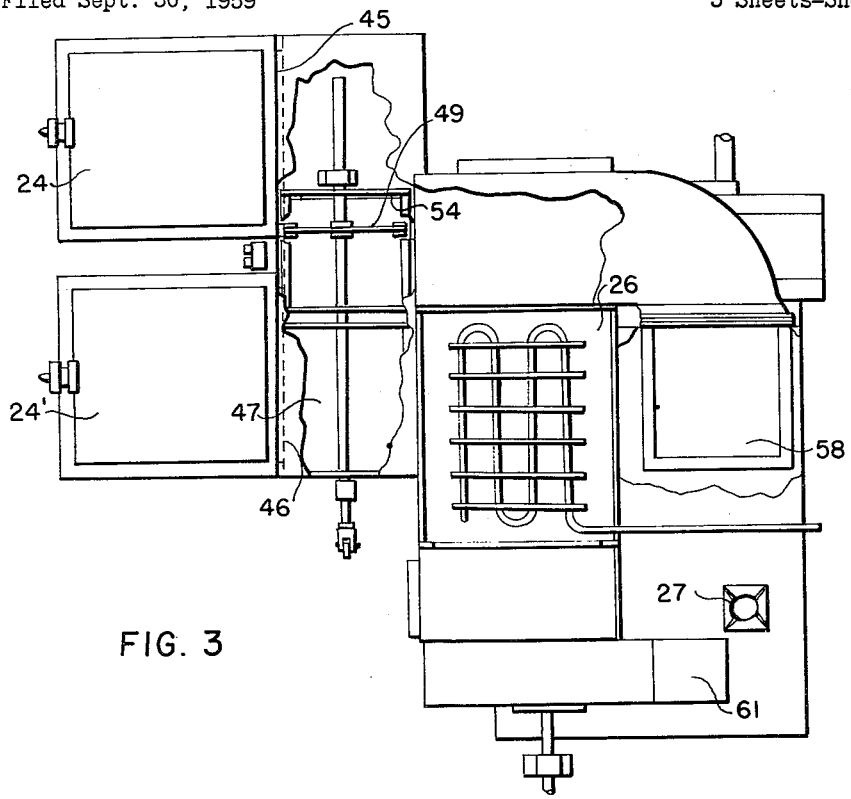
Figure 4:
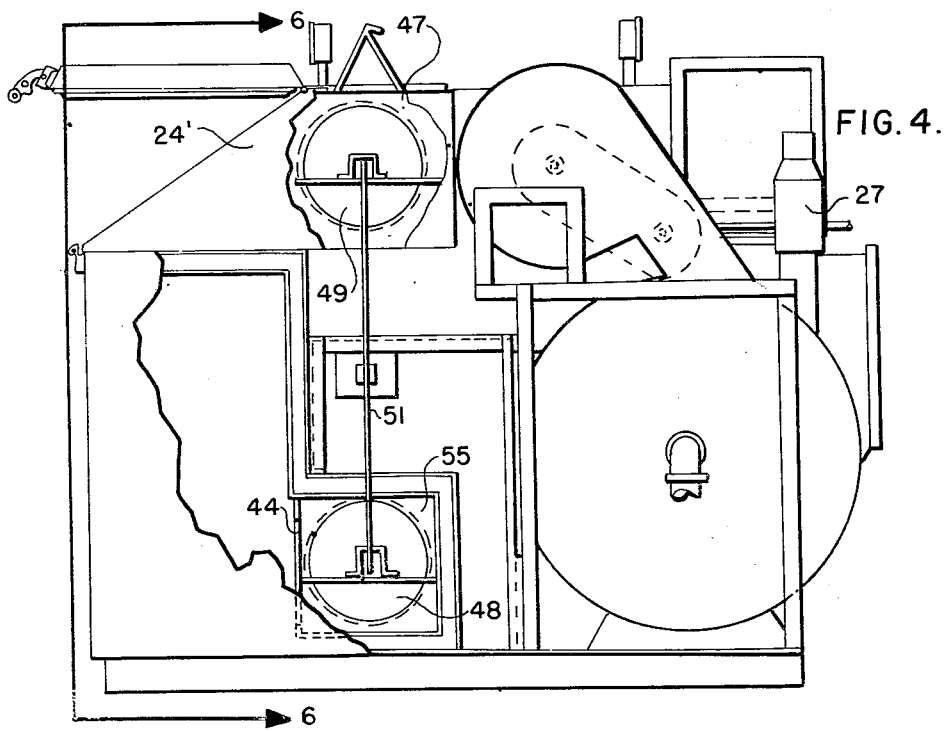
Figure 9:
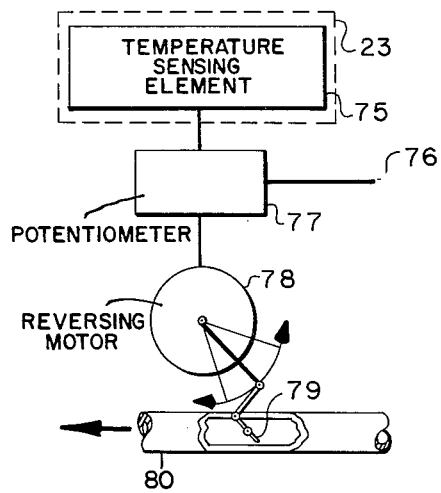
Figure 10:
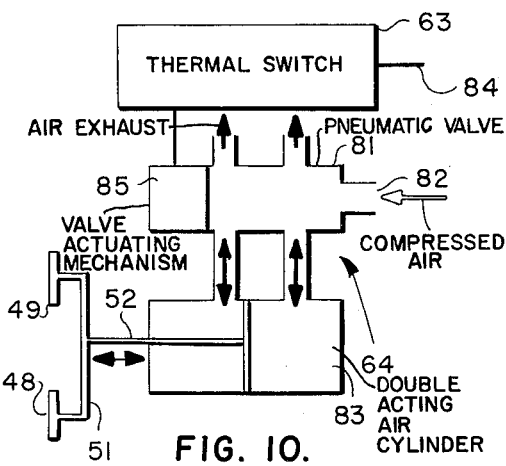
Figure 11:
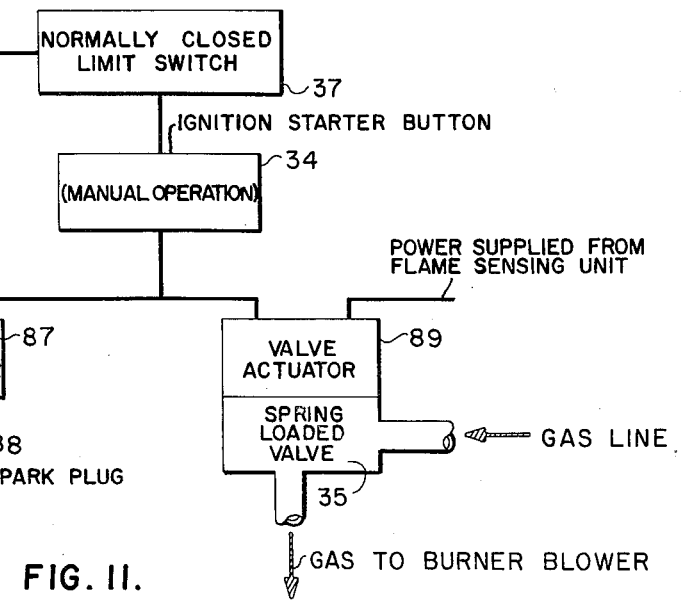

Our invention will be clearly understood by reference to the accompanying drawings in which FIGURE 1 is a rear and side elevation showing the drying apparatus of our invention; FIGURE 2 is a front elevation; FIGURE 3 is a top plan view with a portion cut away to show the path of the heated combustion gases as they leave the drying compartment and return to the combustion chamber; FIGURE 4 is a side elevation of the apparatus, with a portion cut away to show the path of the heated combustion gases as they leave the combustion chamber and enter the drying compartment; FIGURE 5 is a rear view with portions cut away to show the inside of the combustion chamber and the water-cooled condensing chamber; FIGURE 6 is a cross-sectional detail view through line 6—6 of FIGURE 4, showing one of the drying compartments with charged battery cell elements in drying position; FIGURE 7 is an elevation, partially in section of one of the drying compartments; FIGURE 8 is an elevation, partially in section of the damper rod and damper valve assembly used to seal off one of the drying compartments while the other drying compartment is in operation; FIGURE 9 is a schematic view of the automatic temperature control element which is used in the preferred embodiment of our invention; FIGURE 10 is a schematic view of the automatic control element which operates the damper assembly used to shut off one of the drying compartments while the other is in use; and FIGURE 11 is a schematic view of the automatic safety control device which prevents ignition of the burner unless the the proper conditions are present.

One of the essential elements in our improved drying apparatus is a particular type of commercially available burner which is adapted to operate with a minimum amount of oxygen. This type of burner includes a premixing device in which the combustible gas to be used as fuel and the air necessary for combustion are mixed prior to their introduction into the actual zone of combustion. The burner is adjustable so that substantially all the oxygen in the gas-air mixture is consumed during the process of combustion with the result that the gaseous products of combustion are essentially free of oxygen. It is also essential that the apparatus include a device for controlling the composition of the air-gas mixture which is to be fed to the burner. Such a device, which meters and admits the proper amount of fresh air and fuel gas to the pre-mixing device, may be included in the burner unit itself or may be a separate element in the drying apparatus. It is essential for proper operation of our improved drier, therefore, that the burner be of a type which can be adjusted to consume substantially all the oxygen in the gas-air mixture which is used for combustion, and that the burner be accompanied by proper pre-mixing and metering devices. A typical burner meeting the above qualifications is the Model 3T burner manufactured by the C. M. Kemp Manufacturing Co., Baltimore, Maryland.

The new drying apparatus of our invention includes the following basic elements: base 11 of the machine; main circulating fan 12 driven by motor 13 through belt drive 14 and drive shaft 15; secondary circulating fan 16 driven by motor 17 through belt drive 18 and drive shaft 19; burner blower 21; burner nozle 22; combustion 23; drying compartments 24 and 24'; recirculating duct 25; water-cooled condensing chamber 26; and vent stack 27 containing exhaust vent 28, which is located in combustion chamber 23 and which is adjusted so that the combustion gases may escape when the pressure inside the combustion chamber substantially exceeds normal atmospheric pressure. Exhaust vent 28 does not allow outside air to enter the drying apparatus. Power is supplied to the machine through power line 29 and control box 31. Access to recirculating duct 25, for cleaning or repair purposes, is provided by access hatch 32. Explosion door 30 provides an added measure of safety in operating the machine.

Operation of the drying apparatus is carried out as follows:

Main circulating fan 12, secondary fan 16 and burner blower 21 are put into operation, venting hatch 33 is opened and air is allowed to circulate freely through the machine during a timed purge cycle in order to remove all traces of combustible gas which may be present in the machine. At the end of the purge cycle, the operator pushes ignition starter button 34 and then manually opens gas valve 35, which admits the pre-mixed gas-air mixture to the machine. The gas is ignited at the end of burner nozzle 22 in inner combustion chamber 36. Valve 35, ignition starter button 34 and limit switch 37 are electrically interlocked as shown in FIGURE 11, limit switch 37 preventing ignition unless venting hatch 33 is open, and starter button 34 controlling gas valve 35 so that valve 35 can not be opened unless a spark is present to ignite the gas. The firing rate of the burner is controlled by automatic temperature control device 38 to maintain a constant, predetermined temperature in combustion chamber 23 as shown in FIGURE 9.

As stated above, the type of burner used in the drier of our invention is commercially available equipment, and includes the necessary metering and pre-mixing devices, which are not shown in the drawings. The automatic temperature control device, indicated by box 38 in FIGURE 2 of the drawings, is also commercially available equipment, and for this reason has not been shown in detail in the drawings.

After the burner has been ignited, venting hatch 33 is closed, and the machine is operated until the gases in the combustion chamber reach the predetermined temperature. The volume of the gases in the machine is maintained substantially constant by means of exhaust vent 28, which permits the escape of an amount of gas equivalent to the volume of the gas-air mixture which is fed to the burner, thus keeping the pressure in the combustion chamber at substantially atmospheric pressure. The warmup portion of the cycle also serves as a purge cycle, removing substantially all of the air initially present in the machine. The gaseous combustion products, which are substantially devoid of oxygen, therefore serve as the drying atmosphere for the charged battery cell elements.

The course of flow of the heated combustion gases through the machine is as follows: Combustion takes place in inner combustion chamber 36, within combustion chamber 23, flame 39 being shielded from the turbulence set up by the flow of hot gases by flame shield 41. Main circulating fan 12, which is set into the wall of combustion chamber 23 at the end opposite to burner nozzle 22 forces the gaseous combustion products to leave the combustion chamber and enter inlet chamber 42 which provides access to drying compartments 24 and 24' through openings 43 and 44, respectively. Openings 45 and 46 lead from the drying compartments to outlet chamber 47 which in turn provides access to recirculating duct 25. Damper valves 48 and 49, connected by rod 51 and activated by damper control rod 52 are adapted to cooperate with valve seat 53 in inlet chamber 42 and with valve seat 54 in outlet chamber 47 thus sealing off drying compartment 24 and allowing circulation of heated combustion gases through drying compartment 24', or alternatively may cooperate with valve seats 55 and 56 in inlet chamber 42 and outlet chamber 47 respectively, thus sealing off drying compartment 24' and allowing passage of the heated gases through compartment 24. On leaving the drying compartment, the heated gases proceed through protective grid screening 57, 57' which is designed to keep foreign material from entering the duct-work of the apparatus and then enter recirculating duct 25 which leads back to combustion chamber 23 through discharge port 58. A minor proportion of the gaseous atmosphere, usually about 25%, is diverted from main recirculating duct 25 by secondary fan 16 into water-cooled condensing chamber 26 where the moisture in the gas is condensed and removed through gravity drain 59. The dried gases are then fed back into combustion chamber 23 through port 61.

The drying compartments 24, 24' which together make up the drying chamber of the machine, are used in sequence, one compartment being unloaded and reloaded while the other is in operation. Recirculation of the heated gaseous atmosphere through the active drying compartment is continued as described until the cell elements which have been placed in the compartment are dry, as indicated by a rapid rise of temperature of the exhaust gas entering recirculating duct 25, registered on outlet temperature gauge 62. When a predetermined outlet temperature is reached, thermal switch 63 automatically activates pneumatic valve 64, supplied through compressed air inlet 65, which moves damper control rod 52 and damper valves 48 and 49 to their alternative position thus closing off the drying compartment containing the dried cell elements, and opening the second drying compartment to the flow of the heated gaseous atmosphere. Signal light 66 is lighted during the drying cycle in which drying compartment 24 is active; when a new drying cycle is started, this is automatically replaced by signal light 66', indicating that drying compartment 24' is now in use. The operation of the automatic controls of our apparatus is shown schematically in FIGURES 9, 10 and 11 of the drawings.

In FIGURE 9, the temperature sensing element 75 located in combustion chamber 23 responds to changes in the temperature within the combustion chamber and transfers this response to a potentiometer circuit which includes a power line 76 and a potentiometer 77. This circuit supplies current to a reversing motor 78 which controls by its rotation the position of a butterfly valve 79 in the air-gas mixture feed line 80 which supplies burner nozzle 22 (FIGURE 5). The amount of rotation in reversing motor 78 is proportioned to the difference between the set temperature of sensing element 75 and the actual temperature of combustion chamber 23. When the temperature in the combustion chamber drops below the temperature called for by the sensing element 75, the opening of butterfly valve 79 is increased, thus increasing the amount of air-gas mixture fed through feed line 80 to burner nozzle 22, and causing the burner to burn with a hotter flame. Conversely as the temperature in chamber 23 increases, the opening in butterfly valve 79, is closed.

The automatic control element which includes thermal switch 63 is shown in FIGURE 10. Thermal switch 63 is a conventional bimetallic thermostat the contacts of which are designed to close when the bimetallic element is subjected to a temperature higher than the preset temperature. Current to the switch is supplied from power line 84. The bimetallic element is located in outlet chamber 47 and thermal switch 63 closes when the temperature of the heated gaseous atmosphere leaving the drying compartment reaches a predetermined setting. When thermal switch 63 closes, the current is passed to valve actuating mechanism 85 of pneumatic valve 64. The action of valve actuating mechanism 85 is such that the valves indicated generally at 81 change position each time the valve actuating mechanism receives current after a period of no current. Compressed air is supplied to valve 64 through port 82. The action of the actuating valves indicated at 81 is such that each time the position of the valves are reversed, compressed air is supplied to one side of double acting air cylinder 83 and the air is exhausted from the other side of double acting air cylinder 83. The reversal of the air in double acting air cylinder 83 moves control rod 52 thereby changing the position of dampers 48 and 49. This diverts the flow of the heated gaseous atmosphere from one drying chamber to the other. When the heated gases begin to flow through the new drying compartment, the temperature in this compartment is at first lower than the setting of thermal switch 63, and the electrical contacts open again thus resetting valve actuating mechanism 85.

In the automatic safety control device shown in FIGURE 11, electrical current shown at 86 flows from the purge cycle timer (not shown) to normally closed limit switch 37 on venting hatch 33. (If venting hatch 33 is shut, limit switch 37 is open, and the starting circuit is incomplete, making it impossible to start the dryer.) Current flows through limit switch 37 to ignition starter button 34, which is held down manually to start the oven. The current from button 34 passes through ignition transformer 87 to spark plug 88 and to valve actuator 89 for gas valve 35. Valve actuator 89 operates in such a manner that it must be activated before the handle of valve 35 can be manually rotated to open the valve. After a flame is established, current is supplied to valve actuator 89 from a flame sensing unit or control located in combustion chamber 23 and thereafter ignition starter button 34 may be released stopping the spark. If the current from the flame control should cease due to failure of the flame or should ignition starter button 34 be released prematurely, valve 35, being spring loaded, shuts thus shutting off the flame.

In order that the operation of the drying apparatus may be more clearly understood, a typical drying cycle will be described.

Charged battery cell elements consisting of negative plates, positive plates, and battery separators, are prepared for the drying operation by washing the elements in a bath of circulating water until all of the acid remaining in the elements has been removed. If desired the elements are then dipped in a solution of wetting agent in order to assure instant rewetting of the battery separators when permanent electrolyte is added to the dry charged battery.

Recirculating fans 12 and 16 and burner blower 21 are started and the burner is ignited as described above. The machine is adjusted so that the hot gaseous combustion products are delivered to the drying chambers at a volume of about 3,000 cubic feet per minute and a temperature of about 355° F. Venting hatch 33 is then closed and the combustion gases are circulated through drying compartment 24, into recirculating duct 25, condensing chamber 26 and back into combustion chamber 23, as previously described, with drying compartment 24' closed off from the rest of the system by damper valves 48 and 49. During this time, door 67' of drying compartment 24' is opened and a group of charged battery cell elements 68, 68 are placed in the drying compartment. Recirculation is continued until the gas leaving drying compartment 24 reaches the temperature which indicates the end of the drying cycle, at which time thermal switch 63 automatically activates damper valves 48 and 49, which move to their second position, closing off compartment 24 and opening compartment 24' to the flow of the heated gaseous atmosphere. Because the entire width of drying compartment 24' is taken up by the cell elements 68, the hot gases are forced to flow between the separators 69 and the plates 71 and 72 of the cell elements, as shown in FIGURE 6 of the drawings, thus assuring rapid and complete drying of the cell elements. The gases leave drying compartment 24' through outlet opening 46 into outlet chamber 47 and are recirculated through exhaust recirculation duct 25 and then back into combustion chamber 23 through port 58. A portion of the heated gaseous atmosphere passes through condensing chamber 26 where the water contained in the gaseous atmosphere is removed before this portion of the gaseous atmosphere is returned to combustion chamber 23 through port 61.

While the cell elements in compartment 24' are being dried, and compartment 24 is shut off from the flow of heated gaseous atmosphere, door 67 of compartment 24 is opened and the compartment is loaded with a fresh batch of charged cell elements to be dried in the next cycle of the machine.

Recirculation of the heated gaseous atmosphere within the apparatus is continued as described above until the cell elements which have been placed in compartment 24' are dry. Dryness of the cell elements is indicated by a rapid rise of the temperature of the exhaust gas entering recirculation duct 25. Thermostatically operated control switch 63 then causes damper valves 48 and 49 to shift position, closing off drying compartment 24' and allowing passage of the gases through openings 43 and 45 of drying compartment 24. The drying gases are thus automatically cut off from compartment 24' and diverted to compartment 24, and a new drying cycle is started. The dried cell elements are removal from compartment 24' and replaced by another set of washed cell elements. It will be seen, therefore, that the drying apparatus of our invention may be operated in continuous fashion, with the heated gaseous atmosphere being diverted automatically from one drying compartment to the other as soon as the cell elements are completely dry.

Alternatively, if desired, the drier may be constructed with only one drying chamber, and the flow of heated gaseous atmosphere may be diverted from the combustion chamber to a by-pass chamber and thence to the recirculating duct while the drying chamber is opened for unloading and reloading with wet cell elements. Or, if desired more than two drying compartments may be provided, and may be used successively in the drying operation. We have found in general, however, that the use of two interchangeable drying compartments as described above provides a very workable and efficient drier, and allows the operator to achieve a very substantial production capacity in the course of a day.

While the length of the drying cycle in our improved drier is not a critical factor in eliminating oxidation of the negative plates, since the drying atmosphere used is substantially free of oxygen, nevertheless for practical and economic reasons it is desirable to reduce the drying cycle to as short a time as possible. We have found that the temperature, velocity and humidity of the gaseous atmosphere within the drier must be regulated rather carefully in order to accomplish complete drying of the cell elements in the desired time of six minutes or less, and preferably in four to five minutes. Various devices may be used to accomplish this purpose.

The temperature of the drying atmosphere is regulated by adjustment of the firing rate of the burner. When the temperature of the combustion products leaving combustion chamber 23 and entering the drying chambers 24, 24' falls below a predetermined level, the gas-air mixture is admitted to the burner in greater volume, in order to give more heat. Conversely, the heat is automatically reduced if the temperature of the gases entering the drying chambers becomes too high. Although the above-described automatic temperature control is preferred because of its simplicity and efficiency, other methods or devices may be used, if desired, to accomplish the same purpose. For this reason, we do not wish our invention to be limited to the specific method of temperature-control which we have described. The temperature of the drying gases must ordinarily be at least 325° F. and preferably about 350° F. in order for drying to take place within the desired time.

Similarly, the velocity of the drying atmosphere as it is forced through the cell elements has an important effect on the length of the drying cycle. Because of the obstruction to the flow of the heated gases by the cell elements, the pressure below the cell elements and the velocity through the elements are greatly increased. The velocity is so high that it mechanically strips some of the water from the cell elements. The pressure on the outlet side of the drying compartment drops rapidly as the hot gases enter the larger area of the recirculating duct.

We have found, also, that for rapid and effective drying of the cell elements, it is necessary to remove from the heated gaseous atmosphere the water which it picks up as it passes over the cell elements. A substantial amount of the water present in the cell packs is removed with the gases which are exhausted through vent 28. It is possible to accomplish complete drying by this means alone if recirculation is continued for a long enough period. For the very rapid drying which is desirable from an economic point of view, however, removal of some of the water by other means is desirable.

Water may be removed from the recirculating gases in any desired manner. We prefer, however, to pass the recirculating gases through a condenser 26 after their exit from the drying chamber 24, 24' and before they re-enter the combustion chamber 23. The temperature of the condenser jacket, as registered on temperature gauge 73, may be regulated as desired, as by regulating the temperature and rate of flow of cooling water supplied through water inlet pipe 74, in order to remove the desired amount of water from the recirculating gases.

While the condenser may be placed directly in the path of the recirculating gases, so that all the gaseous atmosphere passes through the condenser, we prefer to operate the drier with the arrangement shown in the drawings. It will be seen by reference to FIGURE 3 that only a portion of the heated gaseous atmosphere is subjected to the drying action of the condenser 26, while the remainder of the gaseous atmosphere flows through the main recirculating duct 25. The proportion of the heated gaseous atmosphere which passes through the condenser is regulated by controlling the speed of secondary fan 16 to divert the desired proportion of the recirculating gases into the condenser, and by this means to give the desired amount of drying of the gaseous atmosphere. We have found that this arangement makes possible the removal of the desired amount of water from the recirculating gases in a simple, effective, economical manner.

Alternatively to the use of a condenser, water may be removed from the heated gaseous atmosphere by passing it over a bed of water-absorptive material such as silica gel, or the recirculating gases may be dried in any other manner desired.

It will be seen from the foregoing description of the drying apparatus of our invention that we have provided a means by which charged battery cell elements may be dried rapidly and economically, with little or no oxidation of the negative plates. Our improved drying apparatus, furthermore, is easy to operate, compact and is suitable for use by either large or small manufacturers.

We claim:

1. In apparatus for drying charged storage battery cell elements, said apparatus having a drying compartment for said cell elements, heated gas distribution means including a blower for forcing a heated gas at a high velocity through said drying compartment when said cell elements are in place therein, a combustion chamber including a burner associated therewith for supplying hot products of combustion to said blower, and control means for stopping the flow of said heated gas to said drying compartment when the exit gas from said drying compartment reaches a predetermined temperature, the improvement comprising: two of said drying compartments adapted for repetitive insertion and removal of said cell elements; gas inlet means adapted to supply a combustible air-gas mixture to said burner in substantially stoichiometric proportions whereby said products of combustion are substantially free of free oxygen; a normally closed exhaust vent communicating with said combustion chamber and adapted to relieve the pressure therein when said pressure substantially exceeds atmospheric pressure; damper valves within said heated gas distribution means downstream of said burner and adapted to pass said heated gas from said blower alternately to one of said drying compartments and then to the other; valve actuating means associated with said control means and adapted to actuate said damper valves when the temperature of said exit gas reaches said predetermined temperature; and recirculating conduit means for recirculating said exit gas from said drying compartments to said combustion chamber.

2. The apparatus of claim 1 comprising in addition thereto temperature control means associated with said gas inlet means and adapted to control the temperature of said heated gas from said blower by control of the amount of said combustible air-gas mixture supplied to said burner.

3. The apparatus of claim 1 comprising in addition thereto a condensing chamber adapted to remove moisture from said exit gas and conduit means including an associated secondary blower connected between said recirculating conduit and said condensing chamber, said conduit means being adapted to pass a portion of said exit gas from said recirculating conduit means through said condensing chamber to said combustion chamber.

4. The apparatus of claim 1 comprising in addition thereto means for allowing ignition of said combustible air-gas mixture in said burner only when said normally closed exhaust vent is open, and means for allowing the supply of said combustible air-gas mixture to said burner only when a spark is present therein to ignite the mixture.

5. Apparatus for drying charged battery cell elements in a closed system through which a drying gas is continuously recirculated, comprising: a burner adapted to burn a combustible gas-air mixture with a minimum amount of oxygen and to substantially consume the oxygen supplied to it; a combustion chamber into which said burner discharges hot gases, an exhaust vent communicating with said combustion chamber for the escape of the gases therein when the pressure substantially exceeds normal atmospheric pressure; means for allowing ignition of said burner only when said exhaust vent is open; means for supplying a combustible air-gas mixture to said burner but only when a spark is present to ignite said combustible air-gas mixture; means for controlling the temperature of the gases in said combustion chamber; an inlet chamber; a blower communicating with said combustion chamber and said inlet chamber and adapted to force said gases at high velocity into said inlet chamber; two drying compartments adjoining said inlet chamber and connected thereto; battery cell elements therein, said drying compartments having a size and shape such that their entire cross-sectional area is adapted to be filled by said battery cell elements; damper valves in said inlet chamber and adapted alternately to close off one of said drying compartments and to direct gases from said blower to the other of said drying compartments; an outlet chamber for the reception of gases from said drying compartments; a thermal switch adapted to activate said damper valves when the temperature of the gases in said outlet chamber reach a predetermined level; a main recirculating duct communicating with said outlet chamber and said combustion chamber; a condensing chamber discharging into said combustion chamber; and a secondary blower located in the wall of the main recirculating duct, communicating with said condensing chamber and adapted to divert a portion of the gases from said main recirculating duct into said condensing chamber.

References Cited in the file of this patent

UNITED STATES PATENTS

| | | |
|---|---|---|
| 1,262,841 | Randolph | Apr. 16, 1918 |
| 1,572,849 | Secord | Feb. 9, 1926 |
| 1,938,625 | Engels | Dec. 12, 1933 |
| 1,968,910 | Poole | Aug. 7, 1934 |
| 2,125,382 | Lykken et al. | Aug. 2, 1938 |
| 2,152,367 | Smith | Mar. 28, 1939 |
| 2,641,848 | Wilson | June 16, 1953 |
| 2,884,707 | Sandback | May 5, 1959 |